United States Patent [19]
Park et al.

[11] Patent Number: 5,716,670
[45] Date of Patent: Feb. 10, 1998

[54] SILICON NITRIDE POWDER AND METHOD FOR PRODUCING THE SAME

[75] Inventors: Jin-Joo Park; Atsushi Kimura; Koji Yamaguchi; Akira Yamakawa, all of Hyogo, Japan

[73] Assignee: Sumitomo Electric Industries, Ltd., Osaka, Japan

[21] Appl. No.: 434,759

[22] Filed: May 4, 1995

Related U.S. Application Data

[62] Division of Ser. No. 219,377, Mar. 29, 1994, Pat. No. 5,478,649.

[30] Foreign Application Priority Data

Mar. 30, 1993 [JP] Japan ................................. 5-96639
Mar. 22, 1994 [JP] Japan ................................. 6-76631

[51] Int. Cl.$^6$ .................................................. B05D 7/00
[52] U.S. Cl. ..................... 427/212; 427/215; 427/399; 423/344
[58] Field of Search .......................... 427/215, 399, 427/212; 423/344

[56] References Cited

U.S. PATENT DOCUMENTS 5,030,434  7/1991  Pitzer et al. ........................... 423/344
5,248,490  9/1993  Krause .................................. 423/344

*Primary Examiner*—Shrive Beck
*Assistant Examiner*—David M. Maiorana
*Attorney, Agent, or Firm*—Wenderoth, Lind & Ponack

[57] ABSTRACT

The invention relates to material silicon nitride powder used for production of silicon nitride ceramics products. Provided herein is a material powder which can offer a compact having a homogeneous packing structure of the powder with good reproducibility and also to provide a method for producing the same. Accordingly to the method, a silicon nitride powder is heat treated in two-stage processing, one stage in an inert gas or reducing atmosphere at 100° C.–1000° C. for 5–600 min., and another stage in an oxidizing atmosphere at 300° C.–1200° C. for 5–600 min. As a result of this treatment, a silicon nitride powder is obtained in which its powder particles are crystalline in their interior and are coated with an amorphous layer having a 1–10 nm surface thickness and composed mainly of Si, N, O, and H, an atomic number ratio of oxygen to nitrogen (O/N) of the surface layer being within a range of 0.1–2.0.

8 Claims, No Drawings

SILICON NITRIDE POWDER AND METHOD FOR PRODUCING THE SAME

This is a Divisional of application Ser. No. 08/219,377, filed Mar. 29, 1994 now U.S. Pat. No. 5,478,649.

BACKGROUND OF THE INVENTION

1. Field of the Invention

The present invention relates to material powder used for fabrication of silicon nitride ceramics products which are used for various types of structural materials such as automobile parts. More particularly, the invention relates to the surface characteristics of silicon nitride material powder essential to obtain a high-strength, high-reliability sintered body.

2. Description of the Prior Art

Silicon nitride ceramics are lightweight, superior in heat-, corrosion-, and wear-resistance, and well-balanced in strength and toughness, so that they are expected to be put into practical use in a wide range of applications such as engine parts of automobiles and gas turbine engines. However, the silicon nitride ceramics are brittle such that their mechanical characteristics are largely affected by various defects present in the interior of the sintered body. Among others, their strength characteristic is vulnerable to defects such as voids, impurities, or coarse particles and flaws. These parts have stresses concentrated thereon enough to make sources of fracture, causing the strength of the sintered body to lower to a substantial extent. As a result, silicon nitride ceramics have hitherto been lacking in reliability required to be a practical material.

A silicon nitride sintered body is obtained by firing and thereby solidifying a powder. In more detail, a material powder mixed with a sintering assistant or the like is compacted, and heated in a firing oven, whereby the powder particles are sintered with one another to form a polycrystalline body. Therefore, microstructure of a sintered body will be intensely affected by the characteristics of the material powder.

Conventionally, it has been assumed that the silicon nitride material is preferably provided by a powder that has a high α-fraction of a crystal phase, finer particles, and as small amounts of metal impurities as possible, for the purpose of implementing a sintered body which is homogeneous and has fewer defects. In view of this, material manufacturers have competitively developed material powders having high α-fractions, fine particles, and high degrees of purity. As a result, there has become commercially available high-quality materials of which the α-fraction is over 90%, the mean particle size is under 1 μm, and the iron content is under 100 ppm. This has contributed to a substantial reduction in the generation of impurities and coarse particles contained in the sintered body. Thus, the frequency of occurrence of fractures due to these defects has been lowered by adjusting to sintering conditions.

Further, there have been proposed techniques for removing impurities other than metals present in the surface by surface-treating a produced silicon nitride powder, or for obtaining a high-performance sintered body by varying the surface properties. For example, Japanese Patent Publication No. HEI 4-65002 has disclosed a method for removing chlorine and/or fluorine from silicon nitride by bringing a silicon nitride powder containing chlorine and/or fluorine into contact with a gas containing water vapor at a temperature above 350° C. and below 1100° C. A claim of Japanese Patent Laid-Open Publication No. HEI 4-83758 has disclosed a method using a silicon nitride powder cleaned with a high-purity water. Other available methods include: a method, as disclosed in a claim of Japanese Patent Laid-Open Publication No. HEI 2-107509, for producing a silicon nitride powder with a total oxygen content lower than 1.8 wt %, a ratio of surface oxygen content to total oxygen content being more than 65%, and a fluorine content lower than 35 ppm, the method comprising a step of annealing $Si_3N_4$ powder with a total oxygen quantity of not more than 0.4 wt % in an oxygen-contained atmosphere at a temperature of 700°–1200° C. for 15–90 min.; a method, as disclosed in a claim of Japanese Patent Laid-Open Publication No. HEI 3-199167, for heat treating a silicon nitride powder with a BET specific surface area of 6 $m^2/g$ or more and an oxygen content of 0.3–1.8 wt % in air or an oxidizing atmosphere at a temperature of 250°–800° C. so that increment in the quantity of oxygen contained is 0.1 wt % or less for every 1 $m^2$ surface area of the silicon nitride powder; a method, as disclosed in a claim of Japanese Patent Laid-Open Publication No. HEI 2-172807, for treating a silicon nitride powder with a mixed acid of fluoric and nitric acids; and a method, as disclosed in a claim of Japanese Patent Publication No. HEI 5-13083, wherein a slurry in which water has been added to silicon nitride powder is heated and, with the resultant temperature maintained at 35°–100° C., the silicon nitride powder is wet-crushed while the content of oxygen contained in the silicon nitride powder is increased at the same time.

As shown above, the technique for fabricating fine and high-purity silicon nitride powders has been advanced so far, and further, various types of powder surface treating techniques have been developed. Along with these aspects of advancement, the reliability of silicon nitride sintered bodies and therefore of silicon nitride ceramics products have been greatly improved.

However, silicon nitride ceramics are still insufficient in reliability when used as parts required to have high reliability, such as automobile parts. In other words, silicon nitride ceramics are still low in the fracture strength level and large in the variation of strength.

The present inventors have investigated the cause of the aforementioned problems and, as a result, have found that structure of the compact before sintering accounts for the fact that the resulting silicon nitride sintered body varies in strength and is low in reliability, even when a high-purity fine powder is used. More specifically, in fabricating ceramics, a compacting (or molding) process is necessary to change the powder into a shaped solid. In this process, the compacted body has clearances or voids present among the packed powder particles. These voids, if distributed uniformly in a very small size, would be completely eliminated in the subsequent firing process. However, if the distribution is nonuniform such that large size voids are maldistributed, they will not be eliminated but remain as defects in the sintered body. As a result, no matter how compact a sintered body with fine particles and without impurities is made, these slightly remaining voids would cause the fracture strength of ceramics to lower to a substantial extent.

In this way, conventional silicon nitride sintered bodies would allow the presence of such voids as will incur deterioration of fracture strength. This is due to coarse voids that are generated by the heterogeneous packing structure of powder in the compact as described above. To this point, many engineers have devoted themselves to improvement of this problem experimentally in their own fashion by repeatedly attempting a wide variety of compacting and sintering experiments.

SUMMARY OF THE INVENTION

It is therefore an object of the present invention to provide a material silicon nitride powder which can offer a compact having a homogeneous packing structure of powder with good reproducibility, thereby improving the properties material powder used in preparing a slurry in which the silicon nitride powder has been dispersed in water.

To obtain a compact of a homogeneous packing structure, the state of how the powder is dispersed and flocculated in the slurry is a significant factor which affects the resulting structure of the compact. Intense nonuniform flocculation of the powder in the slurry results in a poor compact, while the packing structure of the compact will vary due to the dispersion structure or dispersion state of the powder in the slurry. Accordingly, to obtain a compact of homogeneous packing structure, it is particularly important, that the powder particles, prior to the compacting process, be in a dispersion and flocculation state appropriate from a microscopic viewpoint and in a dispersion structure or form also appropriate from a macroscopic viewpoint. The compacting method herein referred to is not limitative and any of dry pressing or CIP, wet compacting, injection-molding procedure and the like is applicable.

The flocculation and dispersion state of the powder in a dispersion solvent depends on the surface characteristics of the powder. The present inventors, during the investigation, have found a structure and composition of silicon nitride powder surface and its properties appropriate for obtaining a satisfactory dispersion state.

According to the present invention, first, it is necessary that the crystalline powder particle surface be coated with a 1–10 nm thick amorphous layer composed mainly of Si, N, O, and H, and that the atomic number ratio of oxygen to nitrogen in the layer (hereinafter, referred to as the O/N ratio) is within a range of 0.1–2.0. The thickness of the amorphous layer herein referred to is measured by directly observing the powder with a transmission electron microscope or, for example, by the following method. That is, the powder surface is first coated with metallic ultrafine particles such as of Pt—Pd or Au by vapor deposition and thereafter mixed with an organic adhesive and solidified. Then the solidified matter is formed into a thin film by sputtering, in which state it is observed with a transmission electron microscope.

It is noted that the aforenoted O/N ratio is calculated by measuring the amounts of oxygen and nitrogen, for example, by X-ray photo-electron spectroscopy (XPS).

By achieving the above-described structure and composition of the crystalline powder particle surface, it becomes possible to obtain a compact of such a homogeneous packing structure as could not be found conventionally, with good reproducibility, and therefore to obtain a silicon nitride sintered body with high strength and high reliability.

Also, by controlling the conditions for heat treatment of the material silicon nitride powder as described later, the above-described effect can be further enhanced if the pH of the solution, in which the powder is immersed in neutral water or hot water, is selected from a pH range of 2–8 which is primarily on the acidic side, as the optimum region, in addition to the above surface structure and the composition of the powder particles.

Further, in the present invention, if the heat treatment conditions are set in a particular range within the above pH value range, an even more excellent effect can be obtained by controlling the F ion concentration in the surface amorphous layer, which is another factor that affects the pH value, i.e., by setting the amount of F ions eluted from the powder when the powder is immersed in neutral water or hot water to 1 mg or less for every 1 g of powder.

Needless to say, the pH value is rendered on the acidic side because of the amorphous layer of the powder surface.

First, the surface structure of silicon nitride powder particles to be used is observed by using a transmission electron microscope. Direct observation of the powder allows the layer boundaries in the surface to be defined, whereas the following pretreatment, for example, also allows the observation to be accomplished. The powder surface is first coated with metallic ultrafine particles by vapor deposition. The metallic ultrafine particle coating forms on the outermost surface of the silicon nitride powder particles and serves as a surface protection. The coated powder is kneaded with an organic adhesive and solidified, and thereafter formed into a thin film by sputtering. As a result of this, powder particles are fixed and retained in the resin with particle sections exposed after the formation into the thin film by sputtering. The outermost surface of the exposed particle sections are marked by the coating matter, allowing easy measurement of the surface structure and therefore of the amorphous layer thickness with a transmission electron microscope.

As for the surface composition, the relative atomic number ratios can be determined by quantitatively determining the peak intensities of the Si, N, O, H, etc. of the powder surface measured by, for example, XPS as described before.

Features of the surface structure and composition of the silicon nitride powder particles measured in this way are as described above. It is important that the thickness of the amorphous layer is within the range of 1–10 nm, more preferably 2–4 nm, as described above. In addition to this, it is also important that the O/N ratio of the amorphous layer is within the range of 0.1–2.0, more preferably 0.2–1.3. The provision of such surface structure makes it possible to suppress the silicon nitride from oxidizing and decomposing even in an aqueous solvent, which has hitherto been regarded as unusable for silicon nitride powders, by virtue of the surface amorphous layer that serves as a barrier. Thus, it becomes possible to stably maintain the dispersion and flocculation state that allows the homogeneous packing structure of powder to be formed.

Further, the presence of oxygen and hydrogen atoms in the amorphous layer leads to improved compatibility with water as well as to appropriately controlled dispersion uniformity of powder in the aqueous solvent. Also, the amorphous layer forms a liquid phase together with the sintering assistant in the firing process, exerting a driving force to accelerate the sintering reaction. This amorphous layer, if less than 1 nm thick, could not exert its dispersion improving effect because it is not wetted with the aqueous solvent. Also, when its thickness exceeds 10 nm it causes the sinterability to lower, conversely, and the high-temperature strength of the sintered body as well to lower, unfavorably. At a thickness less than 0.1, the surface O/N ratio causes the compatibility with water to be lowered, which in turn causes flocculation, while a ratio exceeding 2.0 causes the compatibility with water and the repulsive force among the particles to become excessively strong, conversely, to a disadvantage.

With the above-described surface structure and composition achieved and by control of the O/N ratio, there can be obtained a silicon nitride sintered body with high strength and high reliability, which is the object of the present invention. Further, since the dispersion and flocculation of the powder also depends largely on the acidity of the powder surface, a further appropriate dispersion state of the powder can be obtained by setting the pH of the solution, in which the powder has been immersed in neutral water or hot water (hereinafter, referred to as "surface pH"), to the acidic side within a range of 2–8 as described before, if particular fabrication conditions are selected. Thus, a compact of more homogeneous packing structure can be obtained. If the pH value in this case is lower than 2, the powder would result in noticeable flocculation so that coarse secondary particles are formed, in which case a homogeneous packing structure is difficult to obtain in the compacting process while segregation of voids is likely to occur. Also, any pH value greater than pH=8 makes it more difficult to control the dispersion state of the powder, in which case a compact of homogeneous packing structure is also difficult to obtain and unfavorable segregation is more likely to remain.

Further, if the heat treatment conditions as described later are selected in a proper range within the above surface pH range, the amount of F ions eluted from the powder surface when the powder is immersed in neutral water or hot water can be suppressed to less than 1 mg for every 1 g of powder. Moreover, the flocculation of powder is avoided, so that a compact of a more preferable packing structure can be obtained. More than 1 mg/g amounts of fluorine ions eluted from the powder surface would cause a greater tendency for the particles to flocculate with one another in the slurry, and also adversely affects the strength of the under-firing and sintered body. Thus, the amount of such fluorine ions should be not more than 1 mg/g.

Accordingly, the slurry prepared by using the silicon nitride powder of the present invention can offer a compact of homogeneous, i.e., uniform packing structure by controlling its dispersion structure and flocculation state being as previously described. Thus, a sintered body with high strength and less variation in strength can be obtained. In addition, the powder may be applied to various compacting methods.

The silicon nitride powder of the present invention is effectively produced by the following method.

In ordinary silicon nitride powders commercially available, the surface is not controlled in respect to the thickness of the amorphous layer, nor is the O/N ratio controlled. As a first stage, such a silicon nitride powder is heat treated in at least one kind of inert gas or reducing atmosphere selected from nitrogen, argon, helium, ammonium, hydrogen and a mixture thereof at 100° C.–1000° C. for 5 min.–600 min., and thereafter, as a second step, heat treated in an oxidizing atmosphere containing oxygen or water vapor at 300° C.–1200° C. for 5 min.–600 min.

By such two-stage heat treatment, a silicon nitride powder having a surface layer composed of Si, N, O, and H and with a thickness of 1–10nm and an O/N ratio of 0.1–2.0 can be obtained. An appropriate combination of temperature and time in the two-stage heat treatment allows the thickness and O/N ratio of the surface amorphous layer to be controlled within the aforementioned range.

Preferable conditions for the first stage are a temperature range of 600°–900° C. and a time range of 30–300 min. Preferable conditions for the second stage are a temperature range of 500°–900° C. and a time range of 100–400 min. Setting these preferable conditions allows the amorphous layer of the powder surface to be controlled to a thickness of 2–4 nm and an O/N ratio of 0.2–1.3, so that a compact with even more excellent packing structure can be obtained with stability.

The atmosphere for the second stage is required only to be an oxidizing atmosphere containing oxygen and water vapor, but most preferably air from the economic point of view. By implementing the second-stage heat treatment by a continuous treatment program without cooling on the way of treatment, the above-mentioned surface pH can be securely controlled to within a range of 2–8.

The reason of this is not clear, but may be attributed to the fact that, due to the succession of the first stage by the second stage with the surface state kept unchanged as it has reached immediately after the first-stage treatment, the surface state is subtly changed as compared with the case where cooling is temporarily effected on completion of the first-stage treatment. Such powder structure allows further improvement in the degree of packing of the compact.

Also, by setting the temperature for the second stage in this continuous treatment to 500°–900° C., the amount of F ions eluted from the outermost layer of the powder, where the powder has been immersed in neutral water or hot water, can be suppressed to a low value as small as 1 mg or less for every 1 g of powder. It is noted that the F ions are those remaining on the particle surface after the fabrication of material powder as they are bonded therewith, whereas reducing the amount of these ions further improves the packing of the powder in the compacting process.

Rate of temperature increase and decrease in the above heat treatment should be 0.5°–50° C./min., preferably 1°–20° C./min. Less than 0.5° C./min. rates would cause an excessively longer time to be taken, while excessive flocculation of the powder would result because of the ions heating time. Also, more than 50° C./min. rates causes damage of the ceramic casing or substantially reduces the service life, as will be described later.

Under the above-described conditions within the scope of the present invention, the first-stage heat treatment is carried out and successively the second-stage heat treatment is carried out at 500°–900° C. As a result, the surface characteristics of the silicon nitride powder will change into a most preferable state for the purpose of the present invention. Thus, there can be obtained a powder that satisfies the conditions that the powder surface is coated with a 1–10 nm thick amorphous layer composed mainly of Si, N, O, and H, the O/N ratio of surface layer is within a range of 0.1–2.0, and the surface pH is within the range of 2–8 and the amount of eluted fluorine ions is 1 mg/g or less.

As described above, the conditions for the first- and second-stage treatment are set depending on the thickness of the amorphous layer of silicon nitride powder, which is the starting material. When the initial thickness of the amorphous layer is large, the powder is treated at higher temperatures and for a longer time in the inert gas or reducing atmosphere of the first stage. Further, in some cases, the surface is reduced and nitrated to thereby reduce the surface oxidized layer and, in the second stage, oxidizing conditions are relaxed to finely control the properties of the surface layer. On the other hand, when the thickness of the initial amorphous layer is small, the oxidizing conditions in the second stage are restricted conversely so that the oxidation further proceeds. In the first-stage treatment, temperatures lower than 100° C. or time periods less than 5 minutes do not afford enough treatment effects, while 600 minutes results in intense flocculation of the powder, adversely affecting the degree of homogeneous packing of the powder inside the compact.

Also in the second-stage treatment, it is temperatures lower than 300° C. or time periods less than 5 minutes do not cause any changes in powder characteristics, while temperatures higher than 1200° C. or time periods longer than 600 minutes causes flocculation of powder as well as abnormal oxidation, resulting in deterioration of the degree of homogeneous packing of powder inside the compact. Further, the oxidizing atmosphere preferably contains oxygen or water vapor, which is suitable for more effective oxidative modification of the powder surface. As for the heating and cooling rate, rates lower than 0.5° C./min. results in a very long heating time, which cause flocculation of powder to excessively progress, while rates faster than 50° C./min. causes the casing of packed powder to break up due to thermal shocks. The powder treatment casing in this case is preferably other than metallic or organic powders for preventing the casing under treatment from contaminating the silicon nitride powder. Accordingly, it is proper to use a casing of nitride or oxide ceramics. However, since ceramic casings may fracture due to strong thermal shock or, in some worse cases, rupture, it is necessary to choose a casing of proper shape and proper combined structure with heat-resistant metals, depending on the conditions.

The method of the present invention differs from conventionally practiced in-air heating treatments in that a heat treatment in an inert gas or reducing atmosphere is combined with another heat treatment in an oxidizing atmosphere. Such treatment makes it possible to control the thickness, main components, and the O/N ratio of surface layer of the powder.

Further, the above two-stage heat treatments are is carried out continuously without cooling. This makes it possible to control the surface pH of the powder as well as the above surface structure.

Still further, the control of the temperature for the second stage of the continuous treatment to within a particular range makes it possible to suppress the amount of F ions on the powder surface to a low concentration in addition to all the above surface structure characteristics.

Besides, the present method makes it possible to obtain a silicon nitride powder having the desired characteristics after treatment if proper treatment conditions are selected, regardless of the amount of oxygen before treatment of the silicon nitride powder starting material. This is useful also from an industrial point of view. Further, the resulting sintered body are improved in characteristics such as high temperature characteristics (high-temperature bending strength, creep characteristic, antioxidation), friction and wear characteristics, without being limited in strength or toughness.

DETAILED DESCRIPTION OF THE PREFERRED EMBODIMENTS

Examples of the present invention are described hereinbelow.

(EXAMPLE 1)

Commercially available silicon nitride powders A–E (for all of them, α-fraction>80%, mean particle size<10 μm, Fe content: 0.1 wt % or less) made by different manufacturers and methods were heat treated under such conditions as shown in Table 1 and Table 2. Further, to untreated and treated powders of them, a sintering assistant (5 wt % $Y_2O_3$-5 wt % $Al_2O_3$), an organic additive, and an organic binder were added and mixed by a ball mill in water. Thereafter, the mixtures were compacted and sintered by gas pressure in nitrogen at 1800° C. for 2 hrs, whereby a packed sintered body was fabricated. Shown in Table 3 and Table 4 are the powder characteristics before and after the heat treatment, the densities of compacts, and room-temperature three-point bending strength and Weibull coefficient and fracture toughness values of the resulting sintered bodies.

It is noted that "→" in the field of cooling rate in Table 1 or 2 denotes continuous processing of the first- and second-stage heat treatment, and that, in Table 3 or 4, the bending strength of sintered body is a three-point bending strength in accordance with JIS R1601 and the fracture toughness values are obtained by the SEPB method.

The following points were established from data of Tables 1 through 4:

(1) Any powder, if it is an ordinary commercially available powder with α-fraction>80%, mean particle size <10 μm, and Fe content of 0.1 wt % or less, allows a powder and a sintered body intended by the present invention to be obtained if the powder is subjected to a heat treatment under the proper range of conditions (Examples 1-4, 1-15~1-18);

(2) If the atmosphere for the first- and second-stage treatment is properly selected and the heat treatment is carried out with proper temperature and proper time, then a powder and a sintered body intended by the present invention can be obtained (Examples 1-1~1-35);

(3) If a temperature and time program for continuously performing the first- and second-stage heat treatment is involved, a powder controlled for its surface pH can be obtained, so that the compact packing of the powder is further improved and more excellent sintered body characteristics can be obtained (Examples 1-1~1-18, and 1-24~1-35); and (4) If the temperature for the second-stage heat treatment is set to 500°–900° C. in addition to the above continuous treatment, a powder of excellent packing level whose surface pH has been controlled and whose amount of eluted F ions has been controlled can be obtained, in which case the most excellent sintered body characteristics in the scope of the present invention can be obtained (Examples 1-1~1-18, 1-24~1-26, 1-28~1-30, 1-33~1-35).

TABLE 1

| | Type of powder commercially | First-stage heat treatment | | | | | Second-stage heat treatment | | | | | |
| --- | --- | --- | --- | --- | --- | --- | --- | --- | --- | --- | --- | --- |
| Sample No. | available | Atm. | Heating rate (°C./min) | Temp. (°C.) | Time (min) | Cooling rate (°C./min) | Atm. | Heating rate (°C./min) | Temp. (°C.) | Time (min) | Cooling rate (°C./min) | Remarks |
| Comparative Example 1-1 | A | No treatment | | | | | No treatment | | | | | No heat treatment |
| Comparative Example 1-2 | A | No treatment | | | | | air | 20 | 700 | 300 | 10 | No first-stage heat treatment |

TABLE 1-continued

| Sample No. | Type of powder commercially available | First-stage heat treatment | | | | | Second-stage heat treatment | | | | | Remarks |
|---|---|---|---|---|---|---|---|---|---|---|---|---|
| | | Atm. | Heating rate (°C./min) | Temp. (°C.) | Time (min) | Cooling rate (°C./min) | Atm. | Heating rate (°C./min) | Temp. (°C.) | Time (min) | Cooling rate (°C./min) | |
| Example 1-1 | A | Ar | 20 | 300 | 30 | → | air | 20 | 700 | 300 | 10 | Type of first-stage |
| Example 1-2 | A | $NH_3$ | 20 | 300 | 30 | → | air | 20 | 700 | 300 | 10 | atmosphere is |
| Example 1-3 | A | $H_2$ | 20 | 300 | 30 | → | air | 20 | 700 | 300 | 10 | confirmed. |
| Example 1-4 | A | $N_2$ | 20 | 300 | 30 | → | air | 20 | 700 | 300 | 10 | |
| Comparative Example 1-3 | A | $N_2$ | 20 | 80 | 30 | → | air | 20 | 700 | 300 | 10 | First-stage temperature is |
| Example 1-5 | A | $N_2$ | 20 | 150 | 30 | → | air | 20 | 700 | 300 | 10 | confirmed. |
| Example 1-6 | A | $N_2$ | 20 | 500 | 30 | → | air | 20 | 700 | 300 | 10 | |
| Example 1-7 | A | $N_2$ | 20 | 600 | 30 | → | air | 20 | 700 | 300 | 10 | |
| Example 1-8 | A | $N_2$ | 20 | 700 | 30 | → | air | 20 | 700 | 300 | 10 | |
| Example 1-9 | A | $N_2$ | 20 | 900 | 30 | → | air | 20 | 700 | 300 | 10 | |
| Example 1-10 | A | $N_2$ | 20 | 1000 | 30 | → | air | 20 | 700 | 300 | 10 | |
| Comparative Example 1-4 | A | $N_2$ | 20 | 1050 | 30 | → | air | 20 | 700 | 300 | 10 | |
| Comparative Example 1-5 | A | $N_2$ | 20 | 700 | 4 | → | air | 20 | 700 | 300 | 10 | First-stage time is confirmed. |
| Example 1-11 | A | $N_2$ | 20 | 700 | 10 | → | air | 20 | 700 | 300 | 10 | |
| Example 1-12 | A | $N_2$ | 20 | 700 | 150 | → | air | 20 | 700 | 300 | 10 | |
| Example 1-13 | A | $N_2$ | 20 | 700 | 300 | → | air | 20 | 700 | 300 | 10 | |
| Example 1-14 | A | $N_2$ | 20 | 700 | 500 | → | air | 20 | 700 | 300 | 10 | |
| Comparative Example 1-6 | A | $N_2$ | 20 | 700 | 700 | → | air | 20 | 700 | 300 | 10 | |
| Example 1-15 | B | $N_2$ | 20 | 300 | 30 | → | air | 20 | 700 | 300 | 10 | Type of powder is |
| Example 1-16 | C | $N_2$ | 20 | 300 | 30 | → | air | 20 | 700 | 300 | 10 | confirmed. |
| Example 1-17 | D | $N_2$ | 20 | 300 | 30 | → | air | 20 | 700 | 300 | 10 | |
| Example 1-18 | E | $N_2$ | 20 | 300 | 30 | → | air | 20 | 700 | 300 | 10 | |

TABLE 2

| Sample No. | Type of powder commercially available | First-stage heat treatment | | | | | Second-stage heat treatment | | | | | Remarks |
|---|---|---|---|---|---|---|---|---|---|---|---|---|
| | | Atm. | Heating rate (°C./min) | Temp. (°C.) | Time (min) | Cooling rate (°C./min) | Atm. | Heating rate (°C./min) | Temp. (°C.) | Time (min) | Cooling rate (°C./min) | |
| Example 1-19 | A | $N_2$ | 20 | 150 | 30 | 40 | air | 20 | 350 | 300 | 10 | Heat treatment |
| Example 1-20 | A | $N_2$ | 20 | 300 | 30 | 40 | air | 20 | 500 | 300 | 10 | program is non- |
| Example 1-21 | A | $N_2$ | 20 | 700 | 30 | 40 | air | 20 | 600 | 300 | 10 | continuous. |
| Example 1-22 | A | $N_2$ | 20 | 900 | 30 | 40 | air | 20 | 700 | 300 | 10 | |
| Example 1-23 | A | $H_2$ | 20 | 1000 | 30 | 40 | air | 20 | 900 | 300 | 10 | |
| Example 1-24 | A | $N_2$ | 20 | 300 | 30 | → | $O_2$ | 20 | 700 | 300 | 10 | Second-stage |
| Example 1-25 | A | $N_2$ | 20 | 300 | 30 | → | air + water vapor | 20 | 700 | 300 | 10 | atmosphere is confirmed. |
| Example 1-26 | A | $N_2$ | 20 | 300 | 30 | → | $O_2$ + Ar | 20 | 700 | 300 | 10 | |
| Comparative Example 1-7 | A | $N_2$ | 20 | 300 | 30 | → | air | 20 | 250 | 300 | 10 | Second-stage temperature is |
| Example 1-27 | A | $N_2$ | 20 | 300 | 30 | → | air | 20 | 400 | 300 | 10 | confirmed. |
| Example 1-28 | A | $N_2$ | 20 | 300 | 30 | → | air | 20 | 500 | 300 | 10 | |
| Example 1-29 | A | $N_2$ | 20 | 300 | 30 | → | air | 20 | 600 | 300 | 10 | |
| Example 1-30 | A | $N_2$ | 20 | 300 | 30 | → | air | 20 | 900 | 300 | 10 | |
| Example 1-31 | A | $N_2$ | 20 | 300 | 30 | → | air | 20 | 1100 | 300 | 10 | |
| Example 1-32 | A | $N_2$ | 20 | 300 | 30 | → | air | 20 | 1200 | 300 | 10 | |
| Comparative Example 1-8 | A | $N_2$ | 20 | 300 | 30 | → | air | 20 | 1250 | 300 | 10 | |
| Comparative Example 1-9 | A | $N_2$ | 20 | 300 | 30 | → | air | 20 | 700 | 4 | 10 | Second-stage time is confirmed. |
| Example 1-33 | A | $N_2$ | 20 | 300 | 30 | → | air | | 700 | 10 | 10 | |
| Example 1-34 | A | $N_2$ | 20 | 300 | 30 | → | air | | 700 | 150 | 10 | |
| Example 1-35 | A | $N_2$ | 20 | 300 | 30 | → | air | | 700 | 500 | 10 | |
| Comparative Example 1-10 | A | $N_2$ | 20 | 300 | 30 | → | air | 20 | 700 | 700 | 10 | |

Note:
Partial pressure ratio of air to vapor of Example 1-25 is 5:1.
Partial pressure ratio of air to Ar of Example 1-26 is 1:1.

TABLE 3

| Sample No. | Amorphous layer thickness of powder surface (nm) | O/N ratio of powder surface | pH of powder surface | Amount of eluted F ions of powder (mg/g) | Compact density (n = 50) Aver. (g/cm³) | Compact density (n = 50) Variation R (g/cm³) | Sintered body characteristic (n = 30) Bending strength (kg/mm²) | Sintered body characteristic (n = 30) Bending strength Weibull coefficient | Sintered body characteristic (n = 30) Fracture toughness (MPa · m^{1/2}) |
|---|---|---|---|---|---|---|---|---|---|
| Comparative Example 1-1 | 0.1 | 0.05 | 8.8 | 3.0 | 1.42 | 0.35 | 81 | 4.2 | 5.6 |
| Comparative Example 1-2 | 10.8 | 3.0 | 10.0 | 3.0 | 2.11 | 0.20 | 42 | 3.8 | 4.3 |
| Example 1-1 | 2.0 | 0.3 | 3.5 | 0.2 | 1.81 | 0.02 | 172 | 25 | 8.5 |
| Example 1-2 | 3.0 | 0.4 | 3.0 | 0.2 | 1.83 | 0.02 | 170 | 30 | 8.5 |
| Example 1-3 | 1.0 | 0.2 | 3.0 | 0.2 | 1.81 | 0.01 | 169 | 27 | 8.2 |
| Example 1-4 | 3.0 | 0.5 | 4.5 | 0.2 | 1.82 | 0.02 | 175 | 25 | 8.9 |
| Comparative Example 1-3 | 11.5 | 2.8 | 9.5 | 1.8 | 2.03 | 0.23 | 51 | 3.3 | 4.0 |
| Example 1-5 | 10.0 | 1.2 | 8.0 | 0.3 | 1.83 | 0.01 | 168 | 27 | 8.5 |
| Example 1-6 | 4.0 | 1.0 | 6.5 | 0.3 | 1.88 | 0.02 | 173 | 29 | 8.8 |
| Example 1-7 | 3.8 | 0.7 | 5.3 | 0.2 | 1.90 | 0.01 | 175 | 33 | 9.3 |
| Example 1-8 | 3.3 | 0.6 | 4.3 | 0.1 | 1.90 | 0.01 | 173 | 35 | 9.5 |
| Example 1-9 | 2.8 | 0.5 | 3.0 | 0.1 | 1.89 | 0.01 | 175 | 32 | 9.4 |
| Example 1-10 | 2.1 | 0.2 | 3.0 | 0.3 | 1.82 | 0.01 | 165 | 30 | 8.0 |
| Comparative Example 1-4 | 0.5 | 0.02 | 1.8 | 1.3 | 1.42 | 0.22 | 98 | 5.8 | 4.9 |
| Comparative Example 1-5 | 0.6 | 0.03 | 9.2 | 1.3 | 1.40 | 0.21 | 98 | 5.5 | 5.0 |
| Example 1-11 | 3.5 | 1.3 | 5.6 | 0.2 | 1.86 | 0.01 | 169 | 35 | 8.6 |
| Example 1-12 | 3.2 | 1.0 | 4.0 | 0.1 | 1.88 | 0.01 | 174 | 33 | 8.8 |
| Example 1-13 | 3.0 | 0.6 | 3.8 | 0.1 | 1.88 | 0.01 | 175 | 30 | 9.0 |
| Example 1-14 | 3.0 | 0.5 | 3.5 | 0.2 | 1.85 | 0.01 | 165 | 27 | 8.6 |
| Comparative Example 1-6 | 0.9 | 0.03 | 1.9 | 1.4 | 1.41 | 0.23 | 97 | 5.1 | 5.0 |
| Example 1-15 | 4.0 | 1.2 | 7.8 | 0.8 | 1.83 | 0.01 | 168 | 29 | 8.3 |
| Example 1-16 | 3.0 | 0.9 | 3.0 | 0.5 | 1.86 | 0.01 | 170 | 31 | 8.4 |
| Example 1-17 | 2.3 | 0.7 | 5.6 | 0.4 | 1.82 | 0.01 | 163 | 31 | 8.8 |
| Example 1-18 | 2.3 | 0.6 | 2.9 | 0.1 | 1.87 | 0.02 | 174 | 32 | 8.9 |

TABLE 4

| Sample No. | Amorphous layer thickness of powder surface (nm) | O/N ratio of powder surface | pH of powder surface | Amount of eluted F ions of powder (mg/g) | Compact density (n = 50) Aver. (g/cm³) | Compact density (n = 50) Variation R (g/cm³) | Sintered body characteristic (n = 30) Bending strength (kg/mm²) | Sintered body characteristic (n = 30) Bending strength Weibull coefficient | Sintered body characteristic (n = 30) Fracture toughness (MPa · m^{1/2}) |
|---|---|---|---|---|---|---|---|---|---|
| Example 1-19 | 1.0 | 0.15 | 10.0 | 2.0 | 1.67 | 0.07 | 140 | 15 | 6.5 |
| Example 1-20 | 1.3 | 0.18 | 9.8 | 1.3 | 1.68 | 0.05 | 143 | 16 | 7.0 |
| Example 1-21 | 1.8 | 0.30 | 9.8 | 1.3 | 1.69 | 0.05 | 143 | 17 | 7.1 |
| Example 1-22 | 2.0 | 0.50 | 9.6 | 1.2 | 1.69 | 0.05 | 142 | 17 | 7.1 |
| Example 1-23 | 2.2 | 0.84 | 11.0 | 1.2 | 1.67 | 0.08 | 141 | 15 | 6.3 |
| Example 1-24 | 3.2 | 0.8 | 3.2 | 0.1 | 1.87 | 0.01 | 172 | 30 | 8.4 |
| Example 1-25 | 3.5 | 0.9 | 3.5 | 0.1 | 1.88 | 0.02 | 175 | 31 | 8.5 |
| Example 1-26 | 2.8 | 0.5 | 3.0 | 0.1 | 1.85 | 0.01 | 169 | 28 | 8.3 |
| Comparative Example 1-7 | 0.09 | 0.08 | 8.5 | 3.0 | 1.42 | 0.25 | 80 | 4.3 | 4.5 |
| Example 1-27 | 1.1 | 0.15 | 6.6 | 2.0 | 1.72 | 0.05 | 143 | 18 | 7.2 |
| Example 1-28 | 2.0 | 0.3 | 3.0 | 0.2 | 1.73 | 0.02 | 163 | 23 | 8.2 |
| Example 1-29 | 2.5 | 0.5 | 3.0 | 0.2 | 1.78 | 0.01 | 164 | 24 | 7.9 |
| Example 1-30 | 4.0 | 0.9 | 3.1 | 0.1 | 1.78 | 0.01 | 163 | 24 | 8.0 |
| Example 1-31 | 6.3 | 1.4 | 3.0 | 1.8 | 1.70 | 0.05 | 140 | 17 | 7.3 |
| Example 1-32 | 8.4 | 1.8 | 2.5 | 1.9 | 1.71 | 0.05 | 142 | 16 | 7.1 |
| Comparative Example 1-8 | 10.5 | 2.3 | 1.2 | 2.8 | 2.05 | 0.15 | 55 | 3.5 | 6.0 |
| Comparative Example 1-9 | 0.9 | 0.08 | 9.3 | 1.8 | 1.40 | 0.26 | 80 | 4.1 | 4.6 |
| Example 1-33 | 1.0 | 0.2 | 7.0 | 0.2 | 1.76 | 0.03 | 160 | 22 | 7.8 |
| Example 1-34 | 2.5 | 0.4 | 5.3 | 0.2 | 1.78 | 0.02 | 163 | 23 | 8.0 |
| Example 1-35 | 4.0 | 0.8 | 3.0 | 0.2 | 1.76 | 0.02 | 160 | 25 | 7.7 |
| Comparative Example 1-10 | 10.3 | 2.5 | 1.8 | 2.2 | 2.00 | 0.20 | 68 | 3.0 | 4.5 |

As shown in the above examples, since the powder of the present invention is improved in packing level in the compacting process, a high compacting density can be obtained with low variation among solids. As a result, there is offered an effect that bending strength of the final sintered body and its Weibull coefficient and toughness are substantially improved.

(EXAMPLE 2)

Upon samples 1-1~1-4, 1-15~1-18, 1-20~1-22, 1-24~1-27, and 1-31 obtained in Example 1, a 1200° C. high-temperature bending strength and room-temperature friction coefficient (among ceramics of the same material) were confirmed. The results are shown in Table 5, where all the values are on the average of n=5. Also, in Table 5, the friction coefficient of the sintered body is derived from the wear test method in accordance with the ball-on-disk method of JIS R1613.

Further, similar characteristics were verified upon Comparative Examples 1-2, 1-7, and 1-10. The results are shown also in Table 5.

From the results, it can be understood that the samples of the present invention are superior in high-temperature strength, small in friction coefficient, and excellent in heat- and wear-resistance.

TABLE 5

| Sample No. | 1200° C. Bending strength (n = 5) (kg/mm$^2$) | Room-temperature friction coefficient (among ceramics) (n = 5) |
| --- | --- | --- |
| Example 1-1 | 110 | 0.08 |
| Example 1-2 | 112 | 0.07 |
| Example 1-3 | 105 | 0.08 |
| Example 1-4 | 115 | 0.04 |
| Example 1-15 | 105 | 0.05 |
| Example 1-16 | 109 | 0.03 |
| Example 1-17 | 120 | 0.04 |
| Example 1-18 | 121 | 0.07 |
| Example 1-20 | 91 | 0.11 |
| Example 1-21 | 95 | 0.12 |
| Example 1-22 | 96 | 0.12 |
| Example 1-24 | 121 | 0.07 |
| Example 1-25 | 122 | 0.08 |
| Example 1-26 | 111 | 0.09 |
| Example 1-27 | 98 | 0.10 |
| Example 1-31 | 118 | 0.06 |
| Comparative Example 1-2 | 61 | 0.25 |
| Comparative Example 1-7 | 55 | 0.34 |
| Comparative Example 1-10 | 43 | 0.38 |

As described hereinabove, the silicon nitride material powder of the present invention can be used to produce silicon nitride ceramics with high strength and high reliability. Thus, ceramics are further accelerated for practical use as structural components and members that require high reliability, such as automobile parts.

What is claimed is:

1. A method of producing a silicon nitride powder comprising powder particles which are crystalline in their interior and coated on their surfaces with a 1–10 nm thick amorphous layer composed mainly of Si, N, O, and H, and having an atomic number ratio of oxygen to nitrogen (O/N) in a surface layer of within a range of 0.1–2.0 comprising the steps of heat treating a silicon nitride powder in an inert gas or a reducing atmosphere at 100° C.–1000° C. for 5 min.–600 min., and thereafter heat treating the silicon nitride powder in an oxidizing atmosphere at 300° C.–1200° C. for 5 min.–600 min.

2. The method for treating nitride powder as in claim 1 wherein the silicon nitride powder thus produced has the characteristics such that when immersed in neutral water or hot water, the resultant aqueous solution shows a pH within a range of 2–8.

3. The method for treating nitride powder as in claim 1 wherein the silicon nitride powder thus produced contains fluorine ions and, when the powder is immersed in neutral water or hot water, the fluorine ions are eluted from the surface relative to 1 g of the powder at a rate of 1 mg lg or less.

4. The method for producing a silicon nitride powder as claimed in claim 1, wherein the two steps for heat treating a silicon nitride powder are carried out continuously.

5. The method for producing a silicon nitride powder as claimed in claim 1 or 4, wherein a heating rate and cooling rate of the heat treating steps are each within a range of 0.5°–50° C./min.

6. The method for producing a silicon nitride powder as claimed in claim 1 or 4, wherein the inert gas or the reducing gas is at least one gas selected from the group consisting of nitrogen, argon, helium, ammonium, and hydrogen.

7. The method for producing a silicon nitride powder as claimed in claim 1 or 4, wherein the oxidizing atmosphere contains oxygen or water vapor.

8. The method for producing a silicon nitride powder as claimed in claim 1 or 4, wherein treatment temperature in the oxidizing atmosphere is within a range of 500°–900° C.

* * * * *